United States Patent [19]
Benito-Navazo

[11] Patent Number: 6,156,977
[45] Date of Patent: Dec. 5, 2000

[54] DEVICE FOR CONNECTING TWO STRETCHES OF RACEWAY FOR ELECTRICAL CABLE SYSTEM

[75] Inventor: Juan Manuel Benito-Navazo, Sant Cugat del Valles, Spain

[73] Assignee: Aparellaje Electrico, S.A., Barcelona, Spain

[21] Appl. No.: 09/236,287

[22] Filed: Jan. 22, 1999

[51] Int. Cl.[7] .................................................. H02G 3/04
[52] U.S. Cl. .................... 174/97; 174/99 R; 174/101; 138/162
[58] Field of Search ............................ 174/97, 95, 99 R, 174/101, 68.3; 138/166, 162, 115, 111; 220/340

[56] References Cited

U.S. PATENT DOCUMENTS

| | | | |
|---|---|---|---|
| 3,003,794 | 10/1961 | Burley | 285/121 |
| 3,351,699 | 11/1967 | Merckle | 174/35 |
| 3,697,667 | 10/1972 | Pollak et al. | 174/68 C |
| 4,398,564 | 8/1983 | Young et al. | 138/92 |
| 4,423,284 | 12/1983 | Kaplan | 174/101 |
| 4,951,716 | 8/1990 | Tsunoda et al. | 138/162 |
| 5,024,251 | 6/1991 | Chapman | 138/92 |
| 5,089,667 | 2/1992 | Goussin et al. | 174/101 |
| 5,134,250 | 7/1992 | Caveney et al. | 174/101 |
| 5,709,249 | 1/1998 | Okada et al. | 138/162 |
| 5,957,414 | 9/1999 | Perrignon de Troyes et al. | 248/27.1 |

*Primary Examiner*—Kristine Kincaid
*Assistant Examiner*—W. David Walkenhorst
*Attorney, Agent, or Firm*—Staas & Halsey LLP

[57] ABSTRACT

The device, in the active position thereof, provides for a connection between stretches of raceway, each of which includes: a base section with external walls and internal walls, providing for the existence of at least two sub-raceways, and a cover section. The internal surfaces of the bottom walls form between them a dihedral. For each sub-raceway, the device also includes a dihedral closing member, each provided with two end portions which, in the active position of the device, are respectively parallel to the internal surfaces of the bottom walls. Fixedly attached channel-like members project longitudinally from said end portions for connection to the walls of the base sections; and a covering member adapted to cover the closing members at least in part.

9 Claims, 6 Drawing Sheets

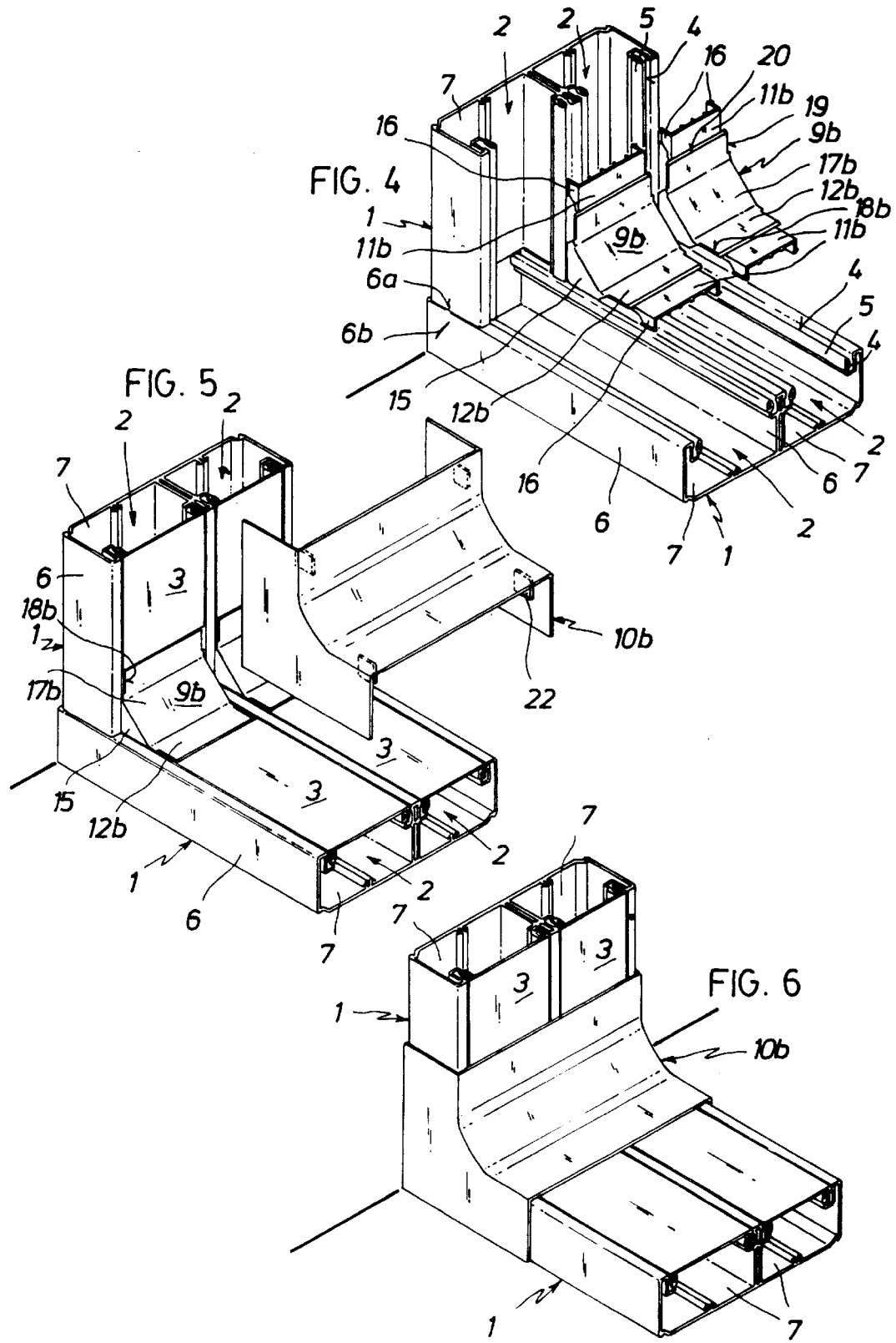

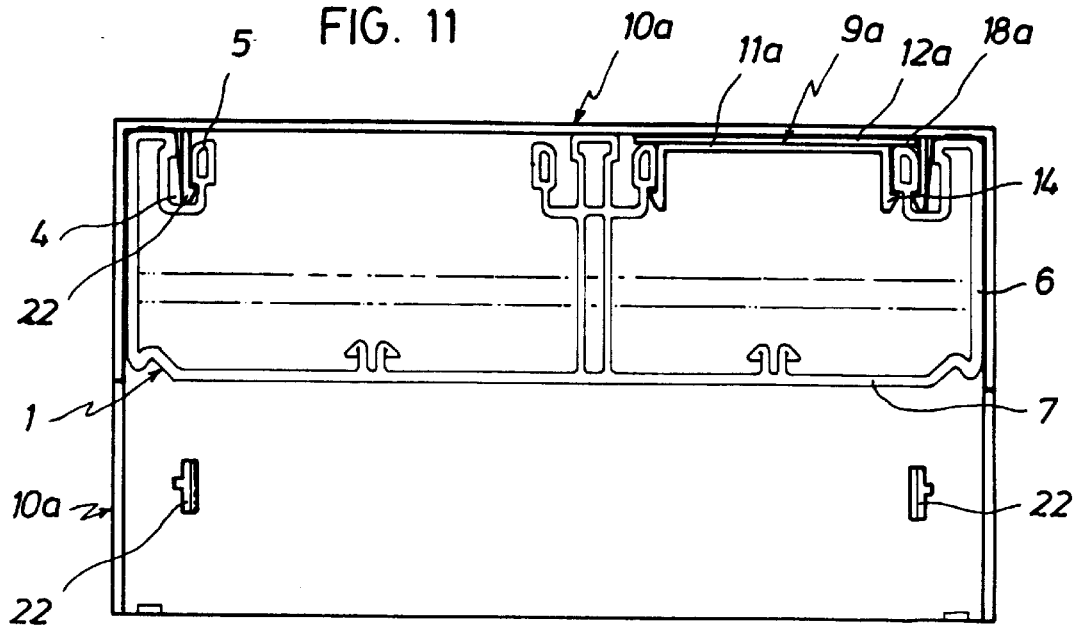
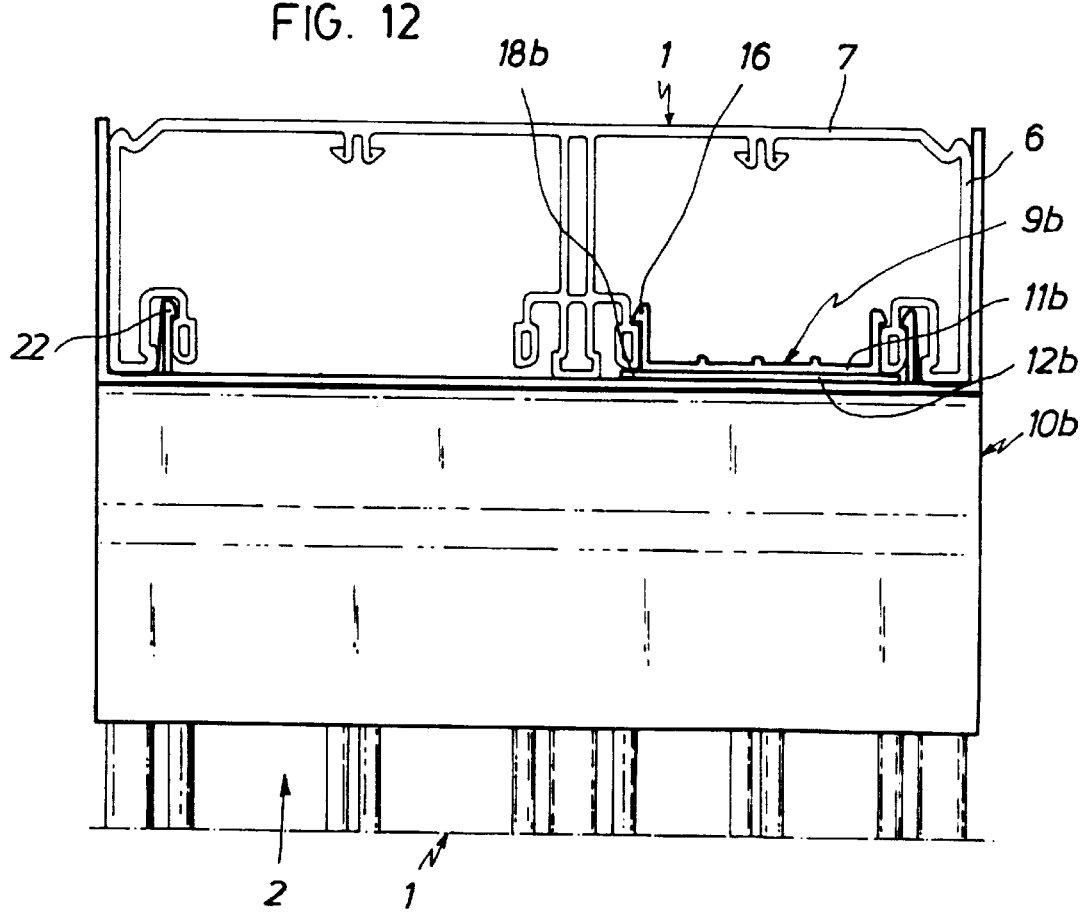

DEVICE FOR CONNECTING TWO STRETCHES OF RACEWAY FOR ELECTRICAL CABLE SYSTEM

BACKGROUND AND SUMMARY OF THE INVENTION

The present invention relates to a device for connecting two stretches of raceway for electrical cable systems, each of said raceway stretches comprising: [i] a base section formed by a bottom wall defining an internal surface; external walls transversally limiting said base section and internal walls, parallel to said external walls, providing for the existence of at least two sub-raceways, said walls being provided at the top end thereof with folds forming longitudinal slots; and [ii] a cover section adapted to engage said longitudinal slots; said internal surfaces of each of said bottom walls forming between them a dihedral; said device being suitable for occupying an active position in which it establishes a connection between said two raceway sections.

In the case of angularly connecting non-compartmented raceways (i.e., without sub-raceways), whether coplanar or not, the regular practice of the installation engineers is simultaneously to mitre the ends of the base and cover sections of each stretch and fit them together directly, without using any item to cover and hide the slits and defects inherent in forming the cut by hand with haphazard means. Nevertheless, angled cover members, which are snap fitted on the coupling arrangements described, have been used in certain cases, overlapping the ends of the base and cover sections of both raceway stretches to be connected.

In other cases, the use is also known for this purpose of accessories forming elbows, which are formed by a channel-like base member, shaped as a concave or convex dihedral and provided with a mating cover member, said accessories allowing the coupling together of the base and cover sections of both raceways without losing, at the elbow, the protection conferred by the raceways to the electrical cable systems.

Similar solutions are used for the longitudinal connection of said raceways, in which the stretches thereof at the join form flat angles or dihedrals.

Solutions similar to the above disclosed have been applied to compartmented raceways, with the exception that the channel-like base member is provided with compartments mating with those of the base sections of the stretches of raceway, the angled cover member being unique and, as in the previous case, devoid of compartments.

The above cases have the serious drawback that when the cover member or equivalent item is removed, all the electrical cables of the different compartments or sub-raceways are uncovered and made accessible. Thus, the electrical cables that should not be disturbed while those that should be are being manipulated may not be isolated and protected.

It is an object of the invention to overcome the above-mentioned drawback. This object is achieved by a device of the type first mentioned above, which is characterized in that it comprises [a] for each sub-raceway, a dihedral closing member, in each of which there are two end portions which, in said active position, are respectively parallel to said internal surfaces of said bottom walls, fixedly attached channel-like members projecting longitudinally from the underside of said end portions and being provided with means for connection to said walls of said base sections; and [b] a covering member adapted to cover said closing members at least in part.

In this way it becomes possible to keep the sub-raceways or alignments of compartments in the connecting device or elbow closed independently and access may be had to any one of them, the others remaining closed, in order to be able to work on the electrical cable systems contained therein, while protecting at the same time the cable systems contained in the others, which should not be disturbed.

Further advantages and features of the invention will be appreciated from the following description in which there are disclosed preferred embodiments without any limiting scope and with reference to the accompanying drawings, in which:

BRIEF DESCRIPTION OF THE DRAWINGS

FIG. 4 is an exploded perspective view of a second embodiment of the invention, with two stretches of raceway forming two sub-raceways of a different width, and with a closing member for each sub-raceway, shown in a position prior to the active assembly position.

FIG. 5 is an exploded perspective view, on a smaller scale, of the raceway stretches of FIG. 4, covered by the corresponding cover sections, and of a covering member, the latter being shown in a position prior to the active assembly position.

FIG. 6 is a perspective view, similar to FIG. 5, in the active assembly position.

FIG. 11 is an elevation view of the embodiment shown in FIG. 3, but omitting the stretches shown vertically in FIG. 3.

FIG. 12 is a plan view from above of the embodiment shown in FIG. 6, but omitting the cover sections.

DESCRIPTION OF THE PREFERRED EMBODIMENT

Figure 2:
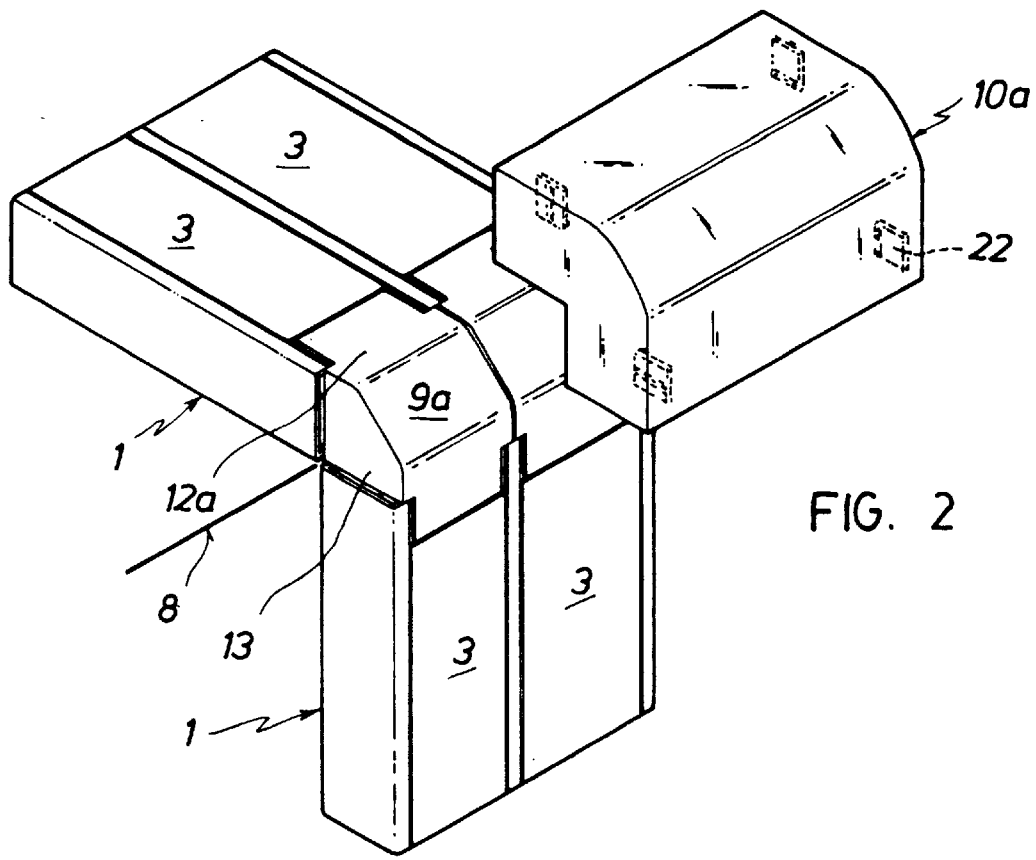
FIG. 2 is an exploded perspective view, on a smaller scale, of the raceway stretches of FIG. 1, covered by the corresponding cover sections, and of a covering member, the latter being shown in a position prior to the active assembly position.
Figure 3:
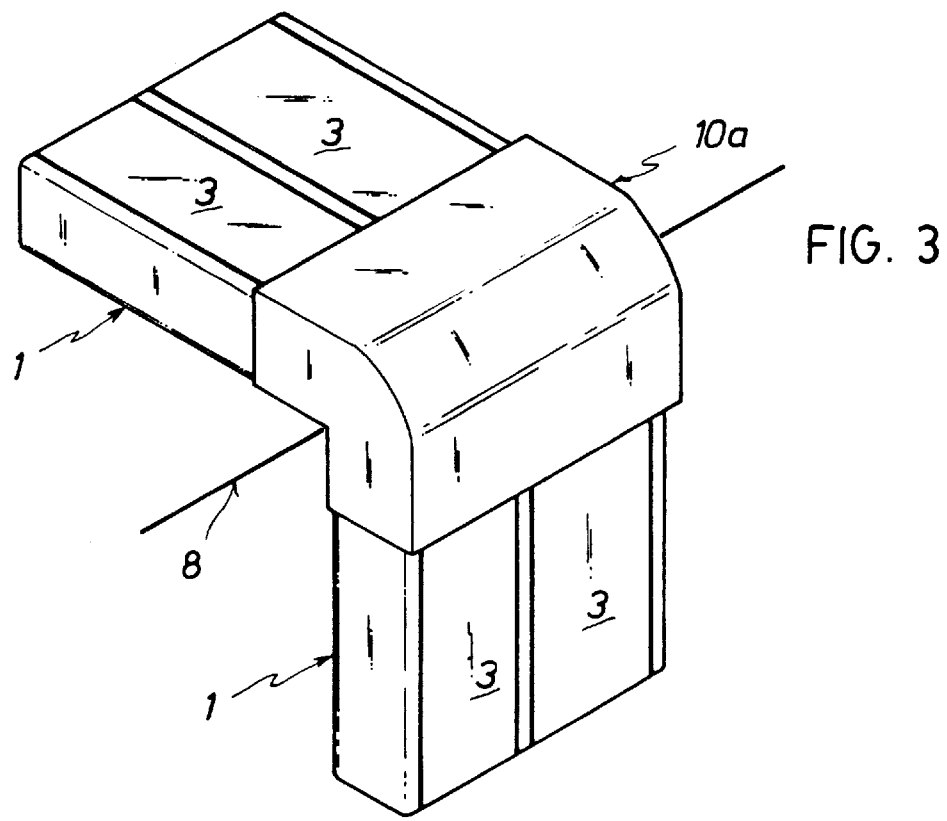
FIG. 3 is a perspective view, similar to FIG. 2, in the active assembly position.

The connecting device of the invention is particularly applicable to raceways for housing electrical cable systems, of the type in which the base sections 1 are compartmented longitudinally into two or more sub-raceways 2 of the same or different width and are associated with the same number of cover sections 3 (FIG. 2) as there are sub-raceways 2 in the base section 1. The cover sections 3 engage the base section 1 by snap fitting tabs of the sections 3 in longitudinal slots 4 formed in the base section 1 by means of folds and beads 5 which terminate the external walls 6 and the internal walls 6' of the base section 1, which walls form the sub-raceways 2 in combination with the bottom walls 7.

Figure 1:
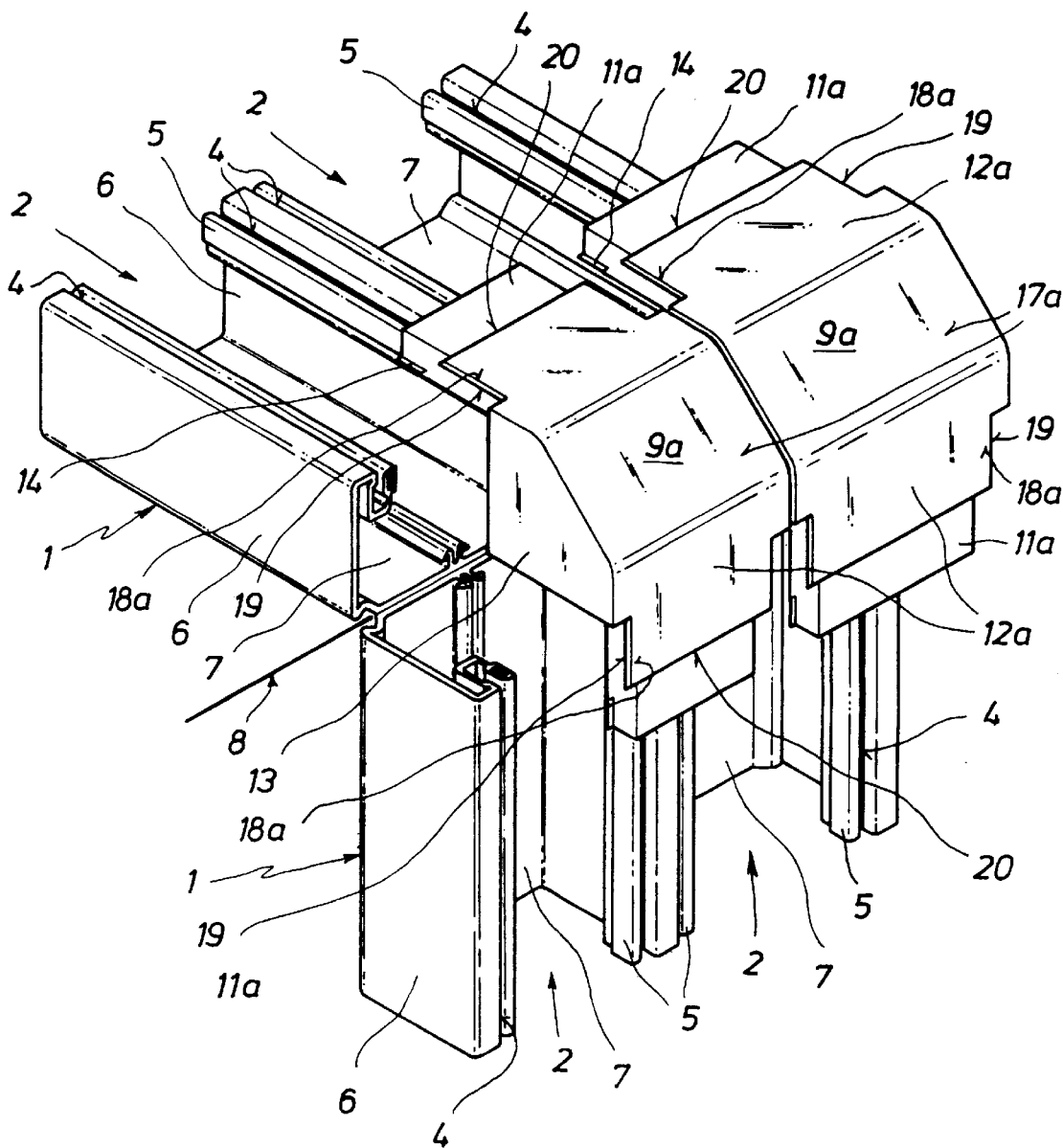
FIG. 1 is an exploded perspective view of a first embodiment of the invention, with two stretches of raceway forming two sub-raceways of a different width, and with a closing member for each sub-raceway, shown in a position prior to the active assembly position.
Figure 7:
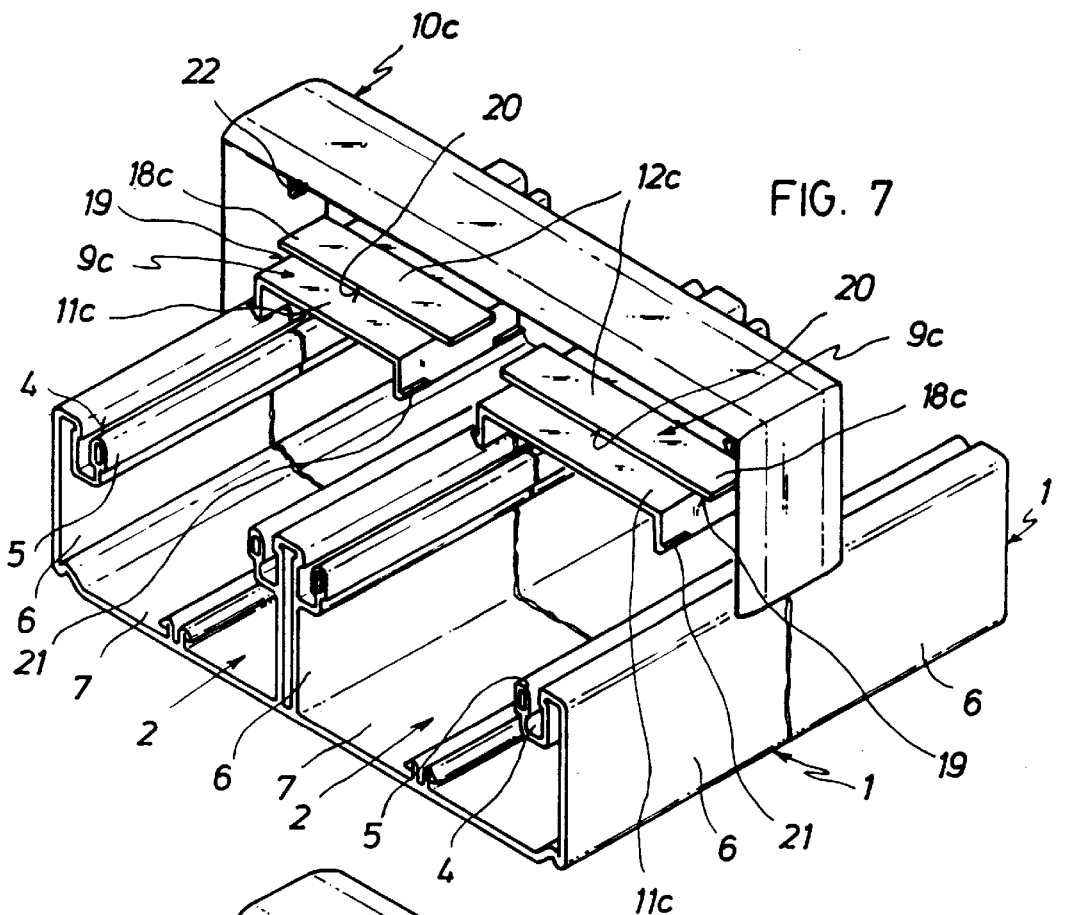
FIG. 7 is an exploded perspective view of a third embodiment of the invention, with two stretches of raceway forming two sub-raceways of a different width, and with a closing member for each sub-raceway and with a covering member, shown in a position prior to the active assembly position.
Figure 8:
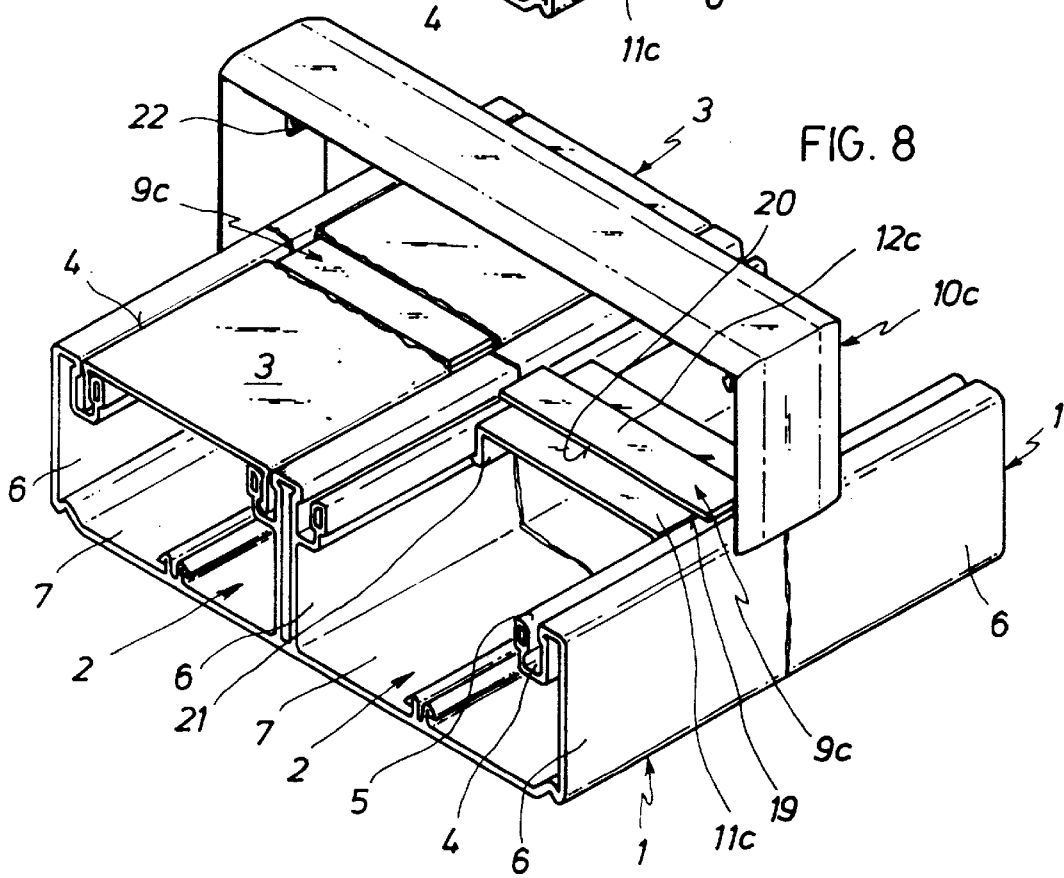
FIG. 8 is an exploded perspective view, on a smaller scale, of the raceway stretches of FIG. 7, with one of the sub-raceways covered by the corresponding cover sections, and of a covering member, the latter being shown in a position prior to the active assembly position.
Figure 9:
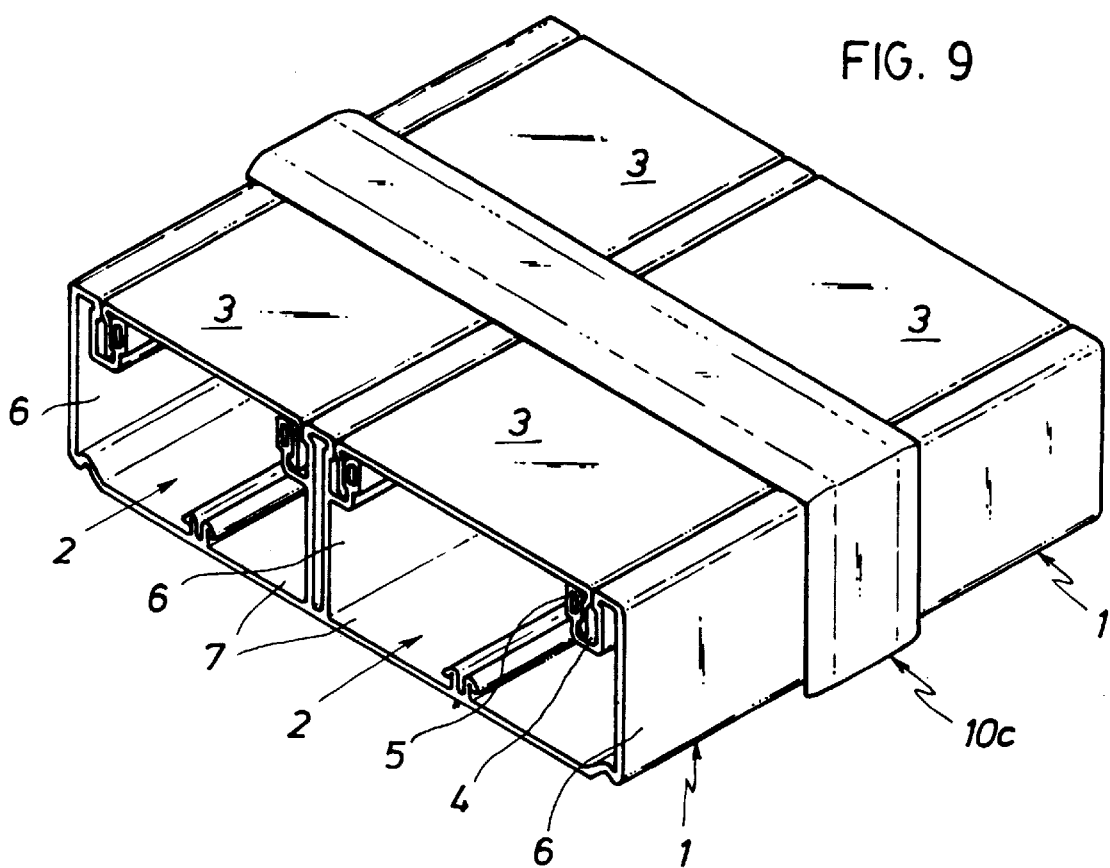
FIG. 9 is a perspective view, similar to FIG. 8, in the active assembly position.
Figure 10:
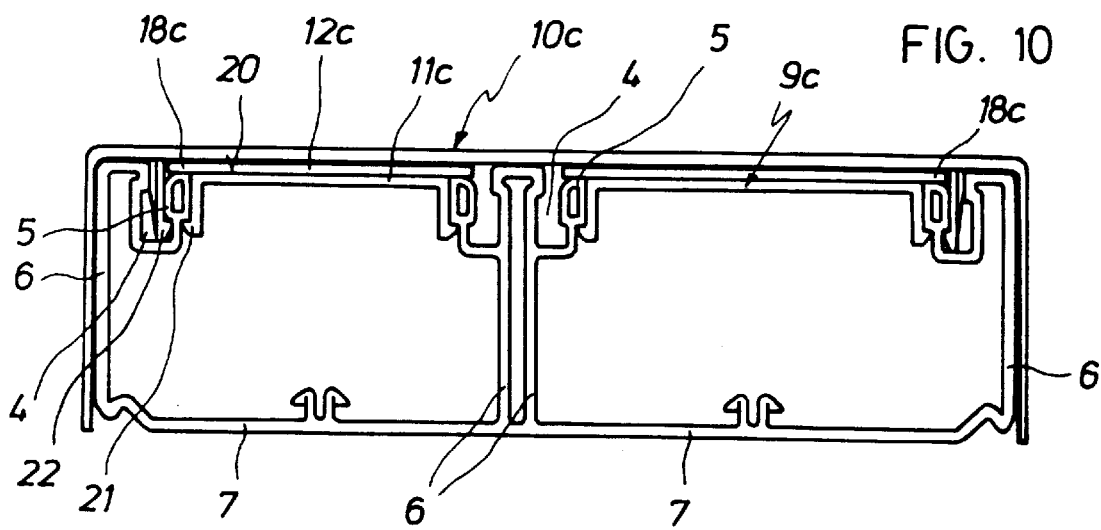
FIG. 10 is an elevation view of the embodiment shown in FIG. 9.

Two stretches of raceway, in which the internal surfaces of their respective bottom walls 7 form a dihedral, about a common transverse edge 8, may be in a position, as may be seen in FIG. 1, in which the dihedral is convex, or the end portions thereof may abut each other transversally (FIG. 4), forming a concave dihedral. In a similar fashion, when two stretches of raceway are situated on one same plane and in alignment, the base sections 1 thereof abut each other end on (FIG. 7) and form a flat dihedral.

According to the invention, a dihedral closing member 9a, 9b, 9c is removeably provided for each sub-raceway 2 and, in the active position or position of use of the device, each of these members comprises portions respectively parallel to the internal surfaces of the bottom walls 7, as indicated hereinafter.

Said closing members 9a, 9b, 9c form together with the walls 6, 6' and the bottom walls 7 of the sub-raceways 2 a closed conduit for the passage of the cable systems, the one formed in one sub-raceway 2 being independent from those formed in the adjacent sub-raceways.

The said closing members 9a, 9b, 9c are provided with means for removeable engagement with the base and cover sections 1 and 3, to be described hereinafter, at the same time as the ensemble of closing members of one same device, used for a particular elbow or straight joint, is hidden by a covering member 10a, 10b or 10c (FIGS. 2 and following), which is also removeably engageable with said base section 1 and overlaps the cover sections 3.

The embodiment illustrated in FIGS. 1, 2, 3 and 11 relates to the case where the dihedral formed by the internal surfaces of the bottom walls 7 is convex. In this case, the closing members 9a comprise two end portions 12a which in said active position of the device are respectively parallel to the internal surfaces of the bottom walls 7. Respective channel-like members 11a are fixedly attached the closing member 9a, to which they are joined at the under surface of the closing member 9a, and project longitudinally from the end portions 12a. The closing member 9a is also provided with lugs 13 having free edges which, in the active position of the device, may engage the free edges of the walls 6, 6', the lug 13 being aligned with these walls 6, 6'.

The closing members 9a are provided with barbs 14 at end portions of the external surface of the walls of the channel-like member 11a, as means for engagement with the base section 1 of the raceway, by snap connection with one edge of the folds and beads 5 external to the longitudinal slots 4, as may be seen in FIGS. 1 and 11.

The embodiment illustrated in FIGS. 4, 5, 6 and 12 relates to the case where the dihedral formed by the internal surfaces of the bottom walls 7 is concave. In this case, the two stretches of raceway abut each other with one end portion superimposed on the other, as may be seen in FIGS. 4 and 5. The closing members 9b, in this case also, comprise two end portions 12b which in the active position of the device are respectively parallel to the internal surfaces of the bottom walls 7. Respective channel-like members 11b are fixedly attached the closing member 9b, to which they are joined at the under surface of the closing member 9b, and project longitudinally from the end portions 12b. The closing member 9b is also provided with lugs 15 which, in the active position of the device, may be partly inserted in the slots 4 of the raceway.

The closing members 9b are provided with barbs 16 extending in the form of an end extension of the walls of the channel-like member 11b as means for engagement with the base sections 1 of the raceway, by snap connection in one edge of the folds 5, external to the longitudinal slots 4, as may be seen in FIGS. 4 and 12.

The closing members 9a and 9b, corresponding to the convex and concave dihedrals, have sloping portions 17a and 17b extending respectively between two end portions 12a or 12b and sloping relative thereto. In the first case, the sloping portion 17a and the end portions 12a form a convex series of external surfaces. In the second case, the sloping portion 17b and the end portions 12b form a concave series of external surfaces.

The end portions 12a, 12b are provided respectively with longitudinal edges 18a, 18b which, in visor fashion, project transversally from the corresponding channel-like members 11a, 11b. The edges 18a, 18b may bear against the folds 5 of the base section 1 (as may be seen in FIGS. 11 and 12) and have a cutaway portion 19 which is dimensioned such as to allow access to the longitudinal slots 4. The end portions 12a, 12b form with the respective channel-like portion 11a and 11b a step 20 of the same height as the thickness of the cover section 3. The transverse dimension of these portions is smaller than the width of the cover sections 3, which overlap the channel-like members 11a and 11b, the width of which is substantially the same as the distance between two facing folds or beads 5.

The embodiment illustrated in FIGS. 7, 8, 9 and 10 corresponds to the case in which the dihedral formed by the internal surfaces of the bottom walls 7 is flat and the two raceway stretches are in end to end abutment. The closing members 9c are flat and the end portions 12c form a continuous extension. They are attached to the channel-like member 11c and the longitudinal edges 18c thereof extend laterally as visors from the corresponding channel-like member 11c, with a dimension substantially the same or slightly smaller than the distance between two facing folds or beads 5 of the base section 1 of the raceway, whereby they may bear against the said folds 5 and allow access to the longitudinal slots 4. The end portions 12c form with the channel-like member 11c a step 20 having a height equal to the thickness of the cover sections 3 which overlap the channel-like member 11c.

The closing members 9c are provided with barbs 21 at the ends of the external surface of the channel-like member 11b as means for engagement with the base sections 1 of the raceway, by snap engagement with one edge of the folds 5 external to the longitudinal slots 4.

The covering members 10a, 10b and 10c, in all the cases of convex, concave or flat dihedral, are provided on the internal surfaces thereof with barbed flanges 22 which may have access to the longitudinal slots 4 through the cutaways 19 provided beside the visor-like longitudinal edges 18a, 18b and 18c of the end portions 12a, 12b and 12c of the closing members 9a, 9b and 9c so as to snap engage with one edge of the folds 5, which is internal to the said longitudinal slots 4 and be removeably retained.

What I claim is:

1. A device for connecting two stretches of raceway for electrical cable systems, each of said raceway stretches comprising: a base section formed by a bottom wall defining an internal surface; external walls transversally limiting said base section, and internal walls parallel to said external walls, providing for the existence of at least two sub-raceways, said external and internal walls being provided at the top end thereof with folds forming longitudinal slots; and a cover section adapted to engage said longitudinal slots; said internal surfaces of each of said bottom walls forming between them a dihedral; said device being suitable for occupying an active position in which it establishes a connection between said two raceway stretches, characterized in that it comprises for each sub-raceway, a dihedral closing member, in each of which there are two end portions which, in said active position, are respectively parallel to said internal surfaces of said bottom walls, fixedly attached channel-like members projecting longitudinally from the underside of said end portions and being provided with means for connection to said walls of said base sections; and a covering member adapted to cover said closing members at least in part.

2. A device according to claim 1, characterized in that when said dihedral formed by said internal surfaces of each of said bottom walls is convex, said closing members are provided with: a sloping portion extending between said two end portions, such that said sloping portion and said end portions define a convex series of external surfaces; and lugs adapted to be aligned with walls of said base sections of said two raceway stretches.

3. A device according to claim 1, characterized in that when the dihedral formed by said internal surfaces of each of said bottom walls is concave, said closing members are provided with: a sloping portion extending between said two end portions, such that said sloping portion and said end portions define a concave series of external surfaces; and lugs adapted to be partly inserted in said slots of said raceway stretch.

4. A device according to claim 2, characterized in that said end portions are provided with longitudinal visor-like edges projecting transversally outwards from said channel-like members and in that said longitudinal edges leave said longitudinal slots accessible in said active position of the device.

5. A device according to claim 1, characterized in that when the dihedral formed by said internal surfaces of each of said bottom walls is flat, said closing members are flat, with said end portions extending continuously and having longitudinal edges projecting laterally outwards from said channel-like members; and in that said longitudinal edges leave said longitudinal slots accessible in said active position of the device.

6. A device according to claim 1, characterized in that when said dihedral formed by said internal surfaces of each of said bottom walls is convex, said connecting means with said walls of said base sections are barbs extending outwardly from said channel-like members.

7. A device according to claim 1, characterized in that when said dihedral formed by said internal surfaces of each of said bottom walls is convex, said connecting means with said walls of said base sections are barbs extending outwardly from said channel-like members.

8. A device according to claim 1, characterized in that when said dihedral formed by said internal surfaces of each of said bottom walls is flat, said connecting means with said walls of said base sections are barbs extending outwardly from said channel-like members.

9. A device according to claims 1, characterized in that said covering member is provided with barbed flanges which are adapted to have access to said longitudinal slots.

\* \* \* \* \*